United States Patent
Nakayama et al.

(10) Patent No.: US 8,384,331 B2
(45) Date of Patent: Feb. 26, 2013

(54) SERVO SYSTEM AND SAFETY CONTROL DEVICE

(75) Inventors: Teruyuki Nakayama, Kusatsu (JP); Minoru Hashimoto, Ritto (JP)

(73) Assignee: Omron Corporation, Kyoto (JP)

( * ) Notice: Subject to any disclaimer, the term of this patent is extended or adjusted under 35 U.S.C. 154(b) by 452 days.

(21) Appl. No.: 12/637,315

(22) Filed: Dec. 14, 2009

(65) Prior Publication Data
US 2010/0164423 A1 Jul. 1, 2010

(30) Foreign Application Priority Data
Dec. 25, 2008 (JP) ................ P2008-329301

(51) Int. Cl.
*G05B 23/02* (2006.01)

(52) U.S. Cl. ........ 318/565; 318/563; 318/560; 318/609; 318/568.13; 318/568.11; 318/568.24; 700/32; 700/80

(58) Field of Classification Search ............. 318/563, 318/565, 560, 609, 568.13, 568.11, 568.24; 700/32, 80
See application file for complete search history.

(56) References Cited

U.S. PATENT DOCUMENTS

| | | | | |
|---|---|---|---|---|
| 4,791,727 A | * | 12/1988 | Hojo et al. | 33/325 |
| 5,834,916 A | | 11/1998 | Shimogama et al. | |
| 6,005,998 A | * | 12/1999 | Lee | 385/33 |
| 6,240,758 B1 | * | 6/2001 | Nagakura | 72/20.1 |
| 6,644,220 B2 | * | 11/2003 | Gangloff et al. | 108/57.32 |
| 6,919,702 B2 | * | 7/2005 | Szulyk | 318/599 |
| 6,920,821 B2 | * | 7/2005 | Ariji | 100/35 |
| 8,084,972 B2 | * | 12/2011 | Strong et al. | 318/400.17 |
| 2006/0061923 A1 | | 3/2006 | Wang et al. | |
| 2007/0124014 A1 | * | 5/2007 | Kim | 700/170 |

FOREIGN PATENT DOCUMENTS

| | | |
|---|---|---|
| EP | 1 560 085 A2 | 8/2005 |
| EP | 1 806 761 A1 | 7/2007 |
| JP | 3525401 B2 | 2/2004 |

OTHER PUBLICATIONS

European Patent Office extended European search report on Application No. 09178268.0-2206 dated Apr. 14, 2010; 7 pages.

* cited by examiner

*Primary Examiner* — Rita Leykin

(74) *Attorney, Agent, or Firm* — Foley & Lardner LLP

(57) ABSTRACT

This invention aims to achieve safety without interchanging an entire existing servo system to a servo system having the safety function. In a servo system including a servo motor, and a servo amplifier for controlling the drive of the servo motor based on the output of an encoder attached to the servo motor, a safety control device for monitoring presence of abnormality based on the output of the encoder, and shielding the supply of drive power to the servo motor if abnormality is present is arranged, and the monitoring content is set as setting information.

9 Claims, 8 Drawing Sheets

SERVO SYSTEM AND SAFETY CONTROL DEVICE

BACKGROUND OF THE INVENTION

This application is based on Japanese Patent Application No. 2008-329301 filed with the Japan Patent Office on Dec. 25, 2008, the entire content of which is hereby incorporated by reference.

1. Technical Field

The present invention relates to a servo system and a safety control device suited for enhancing the safety of the servo system.

2. Related Art

A servo system is used in positioning control and the like of a movable part in various types of machines.

This type of servo system includes a servo system including a servo motor for driving various types of machineries, an encoder attached to the servo motor, a servo amplifier for controlling the operation of the servo motor, an upper level controller such as a programmable controller (PLC) for outputting position command information to the servo amplifier. The servo amplifier controls a drive current to the servo motor such that the position (angle) information from the encoder matches the position command information provided from the upper level controller.

For such a servo system, a waterwheel electric servo device, including a servo motor and a servo amplifier, for driving a guide vane of the waterwheel is disclosed in Japanese Patent No. 3525401. In such a servo device, an output voltage waveform of the servo amplifier is monitored, and an alarm is set off and a guide vane closing device for backup is activated, and the waterwheel is stopped when abnormality of the servo amplifier is detected.

However, Japanese Patent No. 3525401 relates to a drive device for the waterwheel and cannot be applied to various servo systems, and furthermore, it is insufficient with regards to safety function since the abnormality of the output voltage waveform of the servo amplifier is merely monitored.

A servo controller having a safety function for controlling to a safety side when failure occurs has also been proposed, but the entire system needs to be interchanged along with a dedicated servo amplifier, servo motor, and encoder when using such a servo controller.

If the entire servo system is interchanged, the cost becomes high and the know-how etc. accumulated in the existing servo system developed and customized by a user become a waste, and a new servo system needs to be rebuilt.

SUMMARY

The present invention has been devised to solve the problems described above, and an object thereof is to achieve safety without interchanging the entire existing servo system to a system having the safety function.

In accordance with one aspect of the present invention, the present invention is directed to servo system including a servo motor, and a servo amplifier for controlling drive of the servo motor based on an output of an encoder attached to the servo motor, the servo system including: a safety control device, provided with a branched output of the encoder, for providing to an opening and closing unit arranged on a supply line of a drive power between the servo amplifier and the servo motor a safety output for controlling opening and closing; wherein the safety control device monitors presence of abnormality based on the output of the encoder, and opens the opening and closing unit to shield the supply of drive power to the servo motor in a case where abnormality is present.

The abnormality is the abnormality detected based on the output of the encoder, and preferably abnormality of the rotation speed, the rotation angle (position), the rotating direction, or the like of the servo motor.

Abnormality means deviation from a normal value or range, and refers to, for example, the rotation speed, the rotation angle (position), the rotating direction, or the like of the servo motor deviated from the limit value or the limit range of the rotation speed, the rotation angle (position), the rotating direction, or the like of the servo motor set in advance. The limit value and the limit range are preferably set by the user.

The servo motor and the servo amplifier are not limited to one set, and may be a plurality of sets.

The safety output includes a safety output on a dangerous side prohibiting the operation of a machinery driven by the servo motor and a safety output on a safety side permitting the operation of the machinery, where the opening and closing unit is opened by the safety output on the dangerous side, and the opening and closing unit is closed by the safety output on the safety side. If abnormality is present, the opening and closing unit is opened by the output on the dangerous side to shield the supply of the drive power to the servo motor.

According to the servo system of the present invention, with the addition of the safety control device to the servo system, the presence of abnormality such as abnormality in the rotation speed of the servo motor is monitored based on the output of the encoder, and the supply of the drive power to the servo motor is shielded to stop the servo motor if abnormality is present, whereby safety can be realized without interchanging the entire servo system to a system having a safety function.

Furthermore, since the output line of the encoder is branched and the output of the encoder is provided to the safety control device, the presence of abnormality can be monitored, and the opening and closing unit arranged on the supply line of the drive power between the servo amplifier and the servo motor can be opened by the safety output of the safety control device if the abnormality is present to shield the supply of the drive power to the servo motor, and hence the safety control device can be easily added to an existing servo system.

In the servo system according to another aspect of the present invention, the safety control device includes a setting input unit inputted with setting information including a monitoring content in monitoring the presence of abnormality, and performs the monitoring corresponding to the setting information.

The monitoring content includes monitoring items such as the rotation speed, the rotation angle (position), the rotating direction, and the like of the servo motor.

The monitoring content includes the limit value and the limit range of the rotation speed if the parameter that acts as a reference in determining the presence of abnormality such as the monitoring item is the rotation speed of the servo motor, and the limit value and the limit range of the rotation angle if the monitoring item is the rotation angle (position).

If a plurality of servo motors is present, the setting information of the monitoring content is preferably inputted for every servo motor.

If a plurality of servo motors is present, the information specifying another servo motor to shield the supply of the drive power when abnormality occurs in a certain servo motor may be included in the setting information.

The setting information may be set by having the user manually operate a set switch and the like, or may be set using a dedicated tool.

According to such an aspect, the monitoring corresponding to the setting information including the monitoring content is performed, and thus the monitoring content, such as monitoring of the rotation speed and the monitoring of the rotation angle of the servo motor can be selected by the setting information.

In the servo system according to one aspect of the present invention, the safety control device includes a monitoring control input unit provided with a monitoring control input for switching enabling/disabling of the monitoring, and performs the monitoring when the monitoring control input is an input that enables the monitoring and does not perform the monitoring when the monitoring control input is an input that disables the monitoring.

The monitoring control input is an input for enabling or disabling the monitoring, and preferably controls enabling/disabling for every monitoring item or every monitoring servo motor. The monitoring control input may use an input from a safety sensor such as a safety light curtain and a safety door switch. In this case, for example, when the safety sensor detects that a worker has entered the detection region at the periphery of the machinery driven by the servo motor, the monitoring function may be enabled by the input from the safety sensor and the monitoring on whether or not the rotation speed of the servo motor is lower than or equal to the low speed limit speed may be started. Furthermore, instead of using the input from the safety sensor for the monitoring control input, the input corresponding to enabling/disabling from the set switch of the control board may be used as the monitoring control input.

According to the aspect, the enabling/disabling of the monitoring is switched by the monitoring control input, and thus monitoring does not need to be performed on a constant basis, and the monitoring may be started when the worker approaches the machinery driven by the servo motor using the input from the safety sensor.

In the servo system according to another aspect of the present invention, the safety control device includes a safety input unit provided with an emergency stop input, and shields the supply of the drive power to the servo motor in response to the emergency stop input.

The emergency stop input is preferably an input from an emergency stop switch and the like.

According to the aspect, the supply of the drive power to the servo motor is shielded to stop the servo motor in response to the emergency stop input at the time of an emergency.

The servo system according to still another aspect of the present invention further includes a controller for providing a control command to the servo amplifier; wherein when the supply of the drive power to the servo motor is shielded, the safety control device transmits to the controller that the supply of the drive power is shielded. According to the aspect, when the supply of the drive power to the servo motor is shielded by the safety control device, the shielding of the drive power is transmitted to the controller for providing the control command to the servo amplifier, and hence the controller can recognize such shielding and provide an appropriate control command to the servo amplifier.

In the servo system according to yet another aspect of the present invention, the encoder is an incremental encoder in which the output is duplicated, the output of the encoder including an A-phase signal, a B-phase signal, an inverted A-phase signal, and an inverted B-phase signal.

According to the aspect, the output of the encoder used in the monitoring of the presence of abnormality is duplicated, so that the presence of abnormality can be monitored at high reliability.

In the servo system according to yet another aspect of the present invention, the encoder is an incremental encoder in which the output is duplicated, the output of the encoder including a sin signal, a cos signal, an inverted sin signal, and an inverted cos signal.

According to the aspect, the output of the encoder used in the monitoring of the presence of abnormality is duplicated, so that the presence of abnormality can be monitored at high reliability.

In the servo system according to one aspect of the present invention, an additional encoder is attached to the servo motor separate from the encoder; and the safety control device monitors the presence of abnormality based on the outputs of the encoder and the additional encoder.

According to the aspect, even when the output of the encoder is not duplicated, an additional encoder can be added so that the presence of abnormality can be monitored at high reliability using the outputs from both encoders.

In accordance with another aspect of the present invention, there is provided a safety control device, provided with a branched output of an encoder attached to a servo motor, for outputting to an opening and closing unit arranged on a supply line of a drive power between the servo motor and a servo amplifier for controlling drive of the servo motor a safety output for controlling opening and closing; wherein presence of abnormality is monitored based on the output of the encoder, and the opening and closing unit is opened by the safety output to shield the supply of the drive power to the servo motor in a case where abnormality is present.

According to the safety control device of the present invention, with the addition of the safety control device to the servo system, the presence of abnormality such as the abnormality of the rotation speed of the servo motor is monitored based on the output of the encoder, and the supply of the drive power to the servo motor is shielded to stop the servo motor if abnormality is present, whereby safety can be realized without interchanging the entire servo system to a system having a safety function.

Furthermore, since the output line of the encoder is branched and the output of the encoder is provided to the safety control device, the presence of abnormality can be monitored, and the opening and closing unit arranged on the supply line of the drive power between the servo amplifier and the servo motor is opened by the safety output of the safety control device if the abnormality is present to shield the supply of the drive power to the servo motor, and hence the safety control device can be easily added to an existing servo system.

The safety control device according to another aspect of the present invention includes: a setting input unit inputted with setting information including content of the monitoring; and a monitoring control input unit provided with a monitoring control input for switching enabling/disabling of the monitoring; wherein the monitoring corresponding to the setting information is performed when the monitoring control input is an input that enables the monitoring, and the monitoring is not performed when the monitoring control input is an input that disables the monitoring.

According to the aspect, the monitoring corresponding to the setting information including the monitoring content is performed, and thus the monitoring content, for example, the monitoring content such as monitoring of the rotation speed and the monitoring of the rotation angle of the servo motor can be selected by the setting information.

Further, the enabling/disabling of the monitoring is switched by the monitoring control input, and thus monitoring does not need to be performed on a constant basis, and the monitoring may be started when the worker approaches the machinery driven by the servo motor using the input from the safety sensor.

The safety control device according to still another aspect of the present invention further includes: a safety input unit provided with an emergency stop input; wherein the opening and closing unit is opened to shield the supply of the drive power to the servo motor in response to the emergency stop input; and when the supply of the drive power to the servo motor is shielded, the shielding of the supply of the drive power is transmitted to a controller for providing a control command to the servo amplifier.

According to the aspect, the supply of the drive power to the servo motor is shielded to stop the servo motor in response to the emergency stop input at the time of an emergency. When the supply of the drive power to the servo motor is shielded, the shielding of the drive power is transmitted to the controller for providing the control command to the servo amplifier, and hence the controller can recognize such shielding and provide an appropriate control command to the servo amplifier.

According to the present invention, with the addition of the safety control device to the servo system, the presence of abnormality such as the abnormality of the rotation speed of the servo motor is monitored based on the output of the encoder, and the supply of the drive power to the servo motor is shielded to stop the servo motor if abnormality is present, whereby safety can be realized without interchanging the entire servo system to a system having a safety function. Therefore, the customized existing servo system can be effectively utilized at low cost.

DETAILED DESCRIPTION

Hereinafter, embodiments of the present invention will be described with reference to the drawings.

(First Embodiment)

Figure 1:
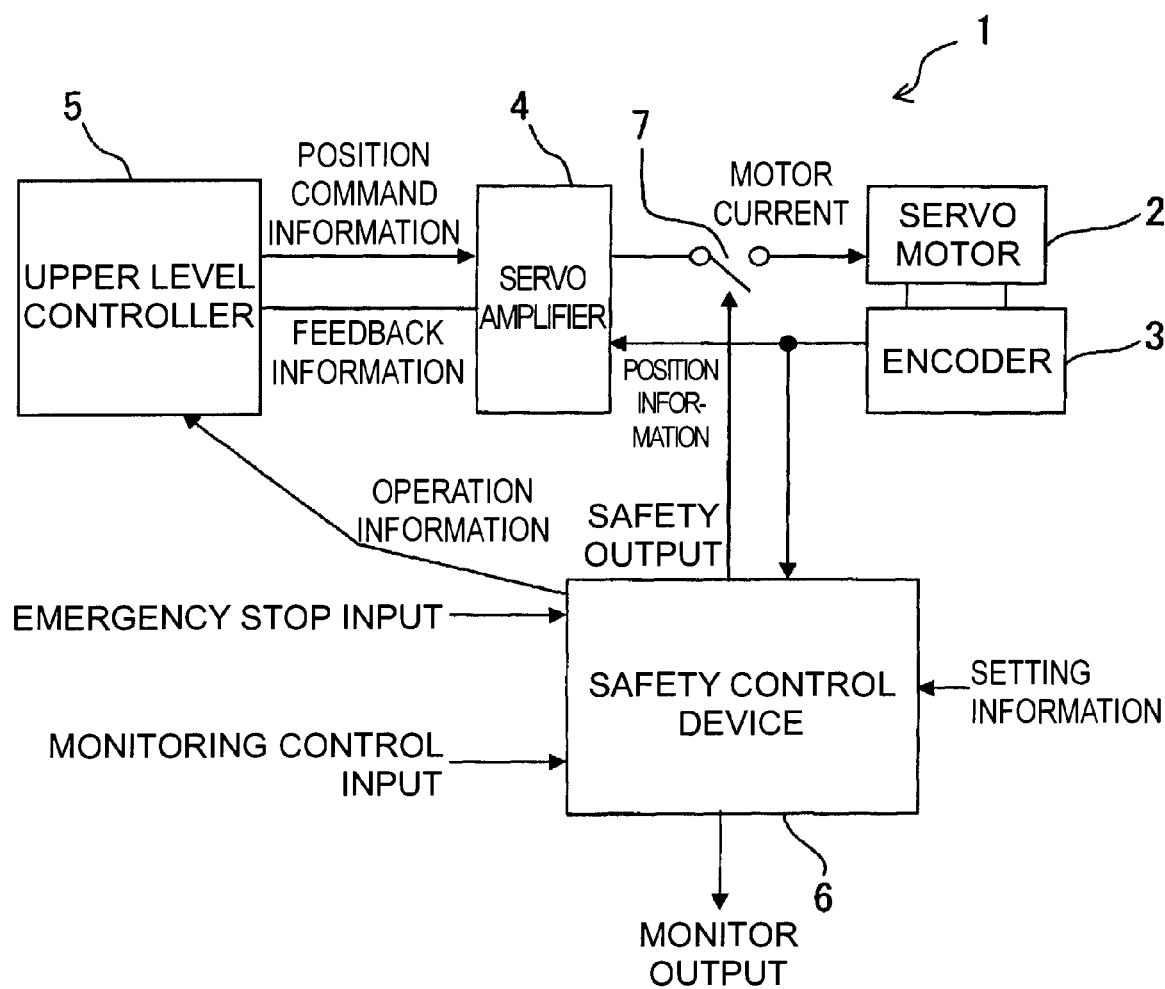
FIG. 1 is a schematic configuration diagram of a servo system according to an embodiment of the present invention.

FIG. 1 is a configuration diagram of a servo system according to an embodiment of the present invention.

A servo system 1 of the present embodiment includes a servo motor 2 for driving various types of machineries such as industrial robot; an encoder 3 directly connected to a shaft of the servo motor 2; a servo amplifier 4 for controlling the operation of the servo motor 2; an upper level controller 5 such as a programmable controller (PLC) for outputting position command information to the servo amplifier 4 and being provided with feedback information from the servo amplifier 4; and also includes a safety control device 6 according to the present invention.

The servo amplifier 4 controls a drive (motor) current to the servo motor 2 based on the position (angle) information as the output of the encoder 2 and the position command information from the upper level controller 5.

The safety control device 6 realizes safety of the servo system, and is provided with a branched output from the encoder 3 to monitor the presence of abnormality based on the output.

The encoder 3 is a known incremental encoder in which the output is duplicated, the output including an A-phase signal and a B-phase signal having a phase difference of 90 degrees and an inverted A-phase signal and an inverted B-phase signal, and such four types of rectangular wave signals are provided to the servo amplifier 4 and to the safety control device 6.

Therefore, since the output of the encoder 3 is duplicated, if the A-phase signal or the B-phase signal is abnormal, for example, the signal inverted from such a signal does not match the inverted A-phase signal or the inverted B-phase signal, and hence the abnormality can be detected. The encoder is not limited to the rectangular wave type for outputting the rectangular wave signal, and an encoder in which the output is duplicated of the sine wave type for outputting four types of sine wave signals, sin signal, cos signal, inverted sin signal, and inverted cos signal may be used.

The safety control device 6 is provided with an emergency stop input from an external emergency stop switch etc., setting information containing monitoring content for monitoring the presence of abnormality, and monitoring control input for switching the monitoring to enable/disable, and monitors the presence of emergency stop input and the presence of abnormality based thereon and provides to a contactor 7 arranged between the servo amplifier 4 and the servo motor 2 a safety output for controlling opening and closing of a contact thereof.

The safety output includes a dangerous side safety output that prohibits the operation of the machinery driven by the servo motor 2, and a safety side safety output that permits the operation of the machinery. The contact of the contactor 7 is opened to shield the supply of drive power to the servo motor 2 by the dangerous side safety output such as the low level safety output, and the contact of the contactor 7 is closed to supply the drive power to the servo motor 2 by the safety side safety output such as the high level safety output. If the case of the emergency stop input or if abnormality is present, the dangerous side safety output is outputted to the contactor 7 to open the contact, thereby shielding the supply of drive power to the servo motor 2.

The setting information may be set by having the user operate a dip switch etc. arranged on the safety control device 6, or may be set using a dedicated tool. The monitoring content contained in the setting information includes monitoring items such as rotation speed, rotation angle (position), or rotating direction of the servo motor 2. Furthermore, the content also includes a limit value or a limit range of the rotation speed, or a limit value or a limit range of the rotation angle that becomes a reference in determining the presence of abnormality.

If a plurality of servo motors is present, the setting information of the monitoring content is preferably inputted for every servo motor.

If a plurality of servo motors is present, the information for specifying another servo motor to shield the supply of drive power when abnormality occurs in a certain servo motor may be contained in the setting information. In other words, when abnormality occurs in a certain servo motor, the supply of drive power to another servo motor specified by the setting information in advance may be shielded with the relevant servo motor.

The setting information also contains the type and content of the communication with the upper level controller 5 such as information on whether the communication complying with a specific communication protocol, or an ON/OFF signal using a plurality of signal lines.

The monitoring control input is an input for switching enabling/disabling of the monitoring function, and is an input for switching whether to perform the monitoring of the monitoring items set by the setting information. The monitoring control input may set enabling/disabling for every monitoring item, or may collectively set enabling/disabling.

For the monitoring control input, inputs from various types of safety sensors such as safety light curtain, safety door switch, and safety mat can be used, so that when the worker detects intrusion to a detection region at the periphery of the machinery driven by the servo motor 2 by the safety light curtain, the monitoring function can be enabled to start monitoring whether or not the rotation speed of the servo motor is lower than or equal to the low speed limiting speed, or when the worker is performing adjustment and maintenance at the periphery of the machinery with the door opened, the monitoring function may be enabled with the input from the safety door switch for detecting the opening of the door as the monitoring control input to start monitoring whether or not the rotation speed of the servo motor is lower than or equal to the low speed limiting speed.

The enabling/disabling of the monitoring function may be set for every monitoring item without using the input from the safety sensor as the monitoring control input, where the enabling/disabling may be set by the set switch of a control board and the input from the set switch may be used as the monitoring control input.

In the safety control device 6, the monitoring of the monitoring item enabled by the monitoring control input such as the rotation speed of the servo motor 2 is performed based on the output from the encoder 3, where determination is made as abnormal if exceeding a set limit value, and the dangerous side safety output for prohibiting the operation of the machinery is outputted to the contactor 7 to open the contact and shield the drive current to the servo motor 2 thereby stopping the servo motor 2.

The safety control device 6 outputs the dangerous side safety output to the contactor 7 when the emergency stop input from the emergency stop switch and the like is made regardless of the monitoring result on the presence of abnormality, and opens the contact of the contactor 7 to shield the current-carrying to the servo motor 2 thereby stopping the servo motor 2. When the drive current to the servo motor 2 is shielded, the safety control device 6 feeds back the notification on such shielding as operation information to the upper level controller 5. The upper level controller 5 then can recognize that the servo motor 2 is stopped by the emergency stop input or the occurrence of abnormality. The operation information fed back from the safety control device 6 to the upper level controller 5 may contain information such as presence of emergency stop input, presence of monitoring control input, that is, whether or not monitoring is being performed, and the like. Furthermore, the operation information to be fed back to the upper level controller 5 may contain information on the monitoring result by a safety monitoring unit, to be described later, for monitoring the abnormality of the internal function of the safety control device 6.

Figure 2:
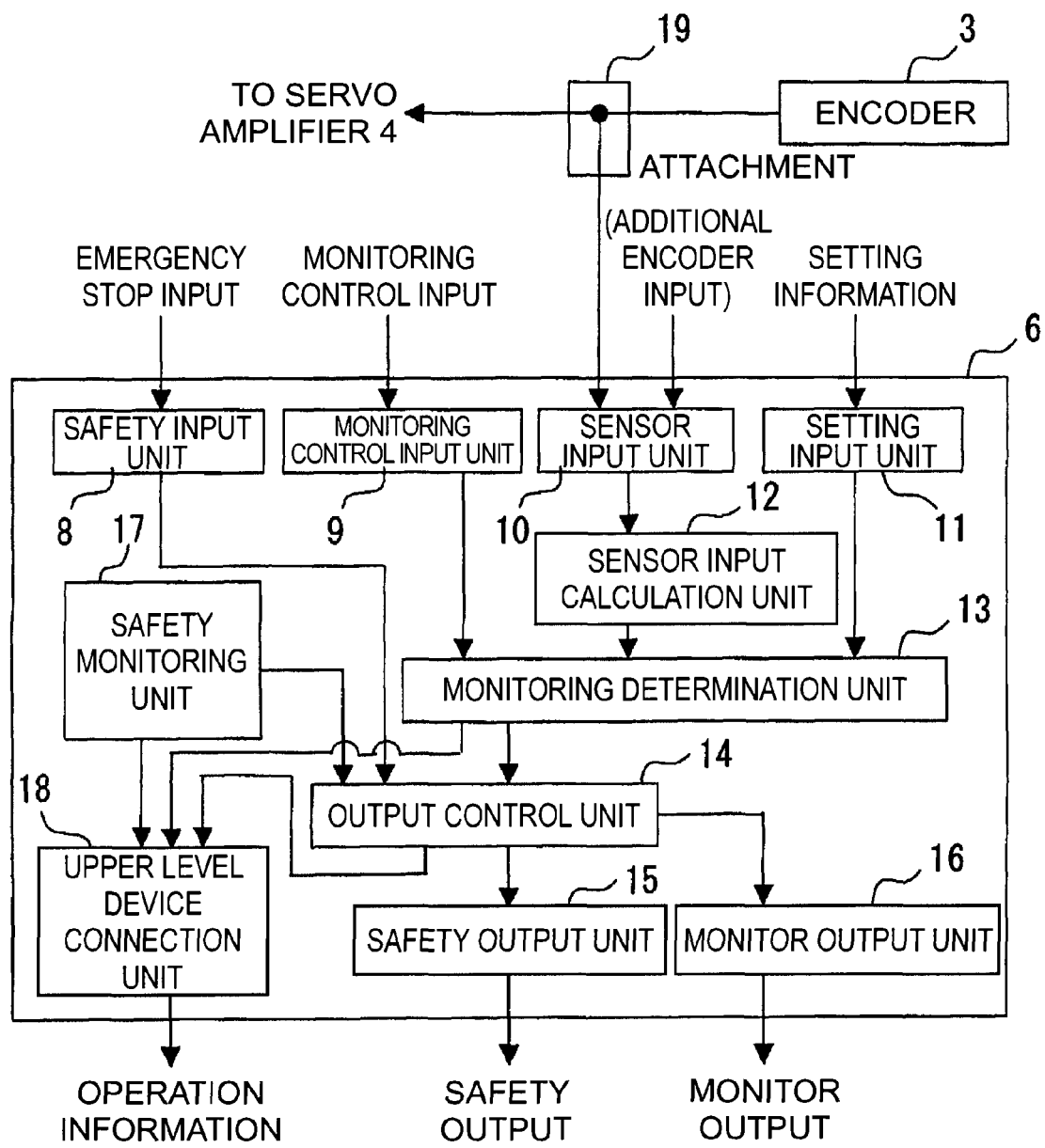
FIG. 2 is a function block diagram of a safety control device of FIG. 1.

The safety control device 6 incorporates a CPU, and has the functions shown in FIG. 2.

As shown in FIG. 2, the safety control device 6 includes a safety input unit 8 externally provided with the emergency stop input, a monitoring control input unit 9 provided with a monitoring control input for switching enabling/disabling of the monitoring function, a sensor input unit 10 provided with the output of the encoder 3, and a setting input unit 11 set and inputted with the setting information containing the monitoring content.

The safety input unit 8 is provided with the emergency stop input from the emergency stop switch etc., and the monitoring control input unit 9 is provided with input from the safety sensor such as the safety light curtain.

The sensor input unit 10 is provided with the output from the encoder 3 after being branched by a dedicated attachment 19. In a system in which a plurality of servo motors is arranged, as hereinafter described, the sensor input unit 10 is provided with the output of the encode corresponding to each servo motor, and is also provided with an output of an additional encoder if an additional encoder is attached to one servo motor, as hereinafter described.

In the present embodiment, the sensor input unit 10 is provided with four types of signals, A-phase signal, B-phase signal, inverted A-phase signal, and inverted B-phase signal from the encoder 3 in which the output is duplicated.

The setting input unit 11 is set and inputted with the above-described setting information containing the items to be monitored, the limit value that acts as a reference in determining the presence of abnormality, and the like.

The output of the encoder 3 inputted to the sensor input unit 10 is shaped, and the cycle and the position of the encoder signal are calculated by a sensor input calculation unit 12.

A monitoring determination unit 13 performs monitoring and determines the presence of abnormality or does not perform monitoring based on the inputs of the monitoring control input unit 9, the sensor input unit 10, and the setting input unit 11. In other words, the monitoring determination unit 13 performs monitoring of the monitoring content set and inputted by the setting input unit 11 if the monitoring is enabled by the monitoring control input of the monitoring control input unit 9, and determines the presence of abnormality. The monitoring is not performed if the monitoring is disabled by the monitoring control input of the monitoring control input unit 9, and thus, the determination on the presence of abnormality is not performed.

The monitoring determination unit 13 determines the presence of abnormality based on the output of the encoder 3 from the sensor input unit 10 for the item to be monitored set and inputted by the setting input unit 11 when the monitoring is enabled by the monitoring control input of the monitoring control input unit 9. For instance, if the monitoring item is the rotation speed of the servo motor 2, the determination is made based on the output from the encoder 3, where determination is made as abnormal if greater than the set limiting speed, and determination is made as normal if smaller than or equal to the set limiting speed.

In the monitoring determination unit 13, the determination on whether or not the output of the encoder 3 itself is normal is also made. In other words, the output of the encoder includes four types, the A-phase signal, the B-phase signal, and the inverted A-phase signal and the inverted B-phase signal, as described above, where determination on whether or not the A-phase signal and the B-phase signal correspond to the inverted A-phase signal and the inverted B-phase signal, respectively, is made, and the output of the encoder 3 is determined as abnormal if correspondence is not found.

In the monitoring determination unit 13, the determination on the presence of abnormality is performed for every servo motor and determination on the presence of abnormality of the output is performed for every encoder in a system including a plurality of servo motors, as hereinafter described.

The output control unit 14 controls the safety output unit 15 for outputting the safety output and the monitor output unit 16 for outputting the monitor output based on each output of the safety input unit 8, a safety monitoring unit 17 for monitoring the abnormality of the internal function, and the monitoring determination unit 13. The output control unit 14 controls the safety output unit 15 for outputting a plurality of safety outputs and the monitor output unit 16 for outputting a plurality of monitor outputs so as to individually correspond to each servo motor in a system including a plurality of servo motors.

The safety monitoring unit 17 self-diagnosis the presence of abnormality of each internal function, and performs monitoring of the clock of the CPU, the voltage of each unit, the internal memory, and the like.

When the emergency stop input is made to the safety input unit 8, the output control unit 14 controls the safety output and the monitor output to the dangerous side of prohibiting the operation of the machinery with respect to the safety output unit 15 and the monitor output unit 16 regardless of the determination result of the monitoring determination unit 13. The output control unit 14 controls the safety output and the monitor output to the dangerous side of prohibiting the operation of the machinery with respect to the safety output unit 15 and the monitor output unit 16 regardless of the determination result of the monitoring determination unit 13 when the abnormality of the internal function is detected based on the monitoring result of the safety monitoring unit 17.

In this embodiment, the process of controlling the safety output to the dangerous side when the emergency stop input is made and when abnormality of the internal function is detected by the safety monitoring unit 17 is a resident process, as hereinafter described.

The output control unit 14 controls the safety output and the monitor output according to the determination result of the monitoring determination unit 13 when the emergency stop input from the safety input unit 8 is not made and the abnormality of the internal function is not detected by the safety monitoring unit 17. Specifically, when determined as abnormal by the monitoring determination unit 13, the safety output and the monitor output are controlled to the dangerous side of prohibiting the operation of the machinery, and when determined as normal, the safety output and the monitor output are controlled to the safety side of permitting the operation of the machinery. When monitoring is not performed, the safety output and the monitor output are controlled to the safety side of permitting the operation of the machinery.

The safety output unit 15 opens the contact by providing the safety output on the dangerous side of prohibiting the operation of the machinery to the contactor 7 according to the control of the output control unit 14, and shields the drive current to the servo motor 2 to stop the servo motor 2, or closes the contact by providing the safety output on the safety side of permitting the operation of the machinery to the contactor 7 and supplies the drive current to the servo motor 2.

The monitor output unit 16 provides a monitor output to an indication lamp and the like to lighting display that the drive current to the servo motor 2 is shielded.

An upper level device connection unit 18 transmits the internal operation information on whether or not the drive current to the servo motor 2 is shielded to the upper level controller 5 as a feedback signal.

Figure 3:
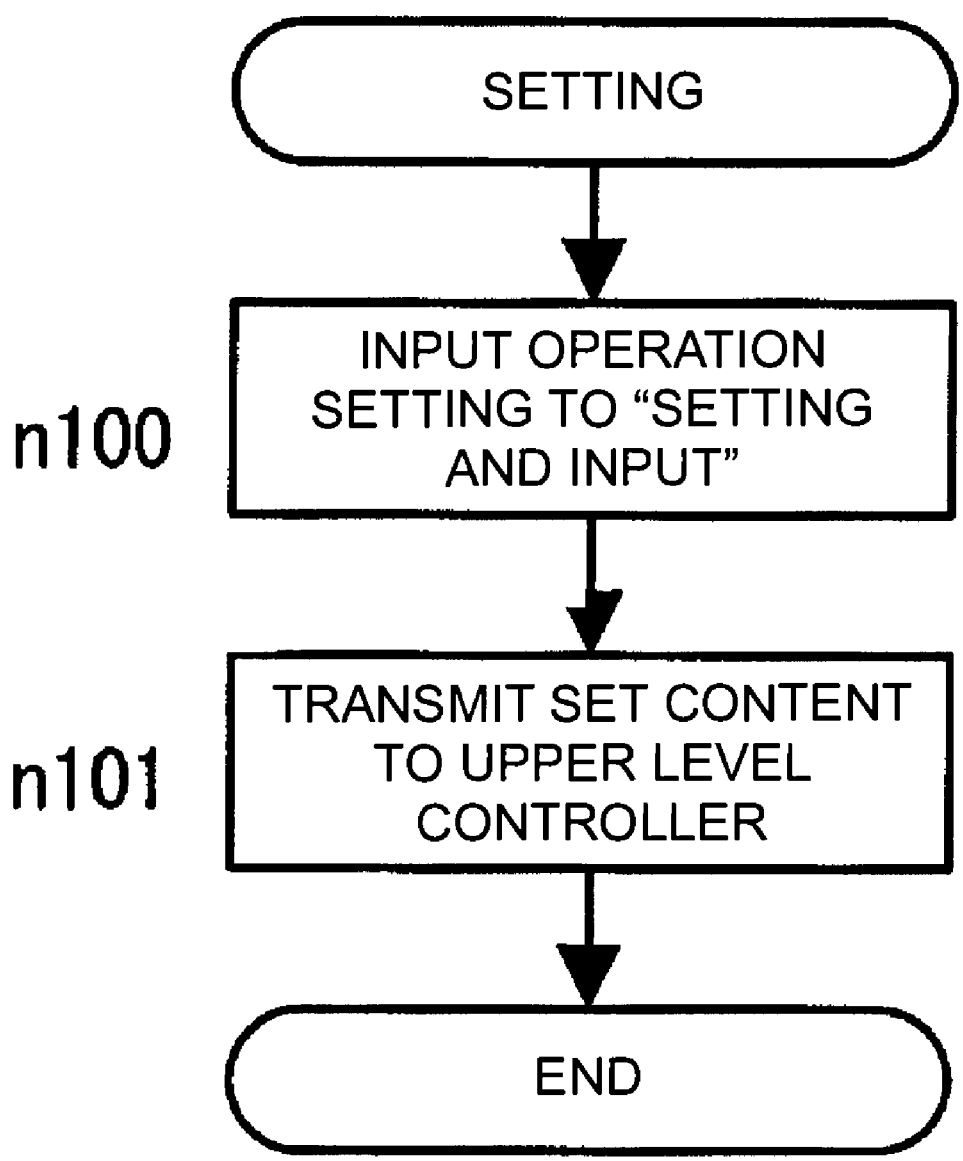
FIG. 3 is a flowchart at the time of initial setting.

FIG. 3 is a flowchart for describing the operation at the time of initial setting in the embodiment of the present invention.

First, various operation settings are performed. Specifically, setting and input are made with the monitoring content, parameter necessary for the monitoring content, association of the monitoring content and the output control, and the like as the setting information, and the communication setting such as the communication data and the communication method is performed on the upper level controller 5 (step n100). The set content is then transmitted to the upper level controller 5, and the process is terminated (step n101).

Figure 4:
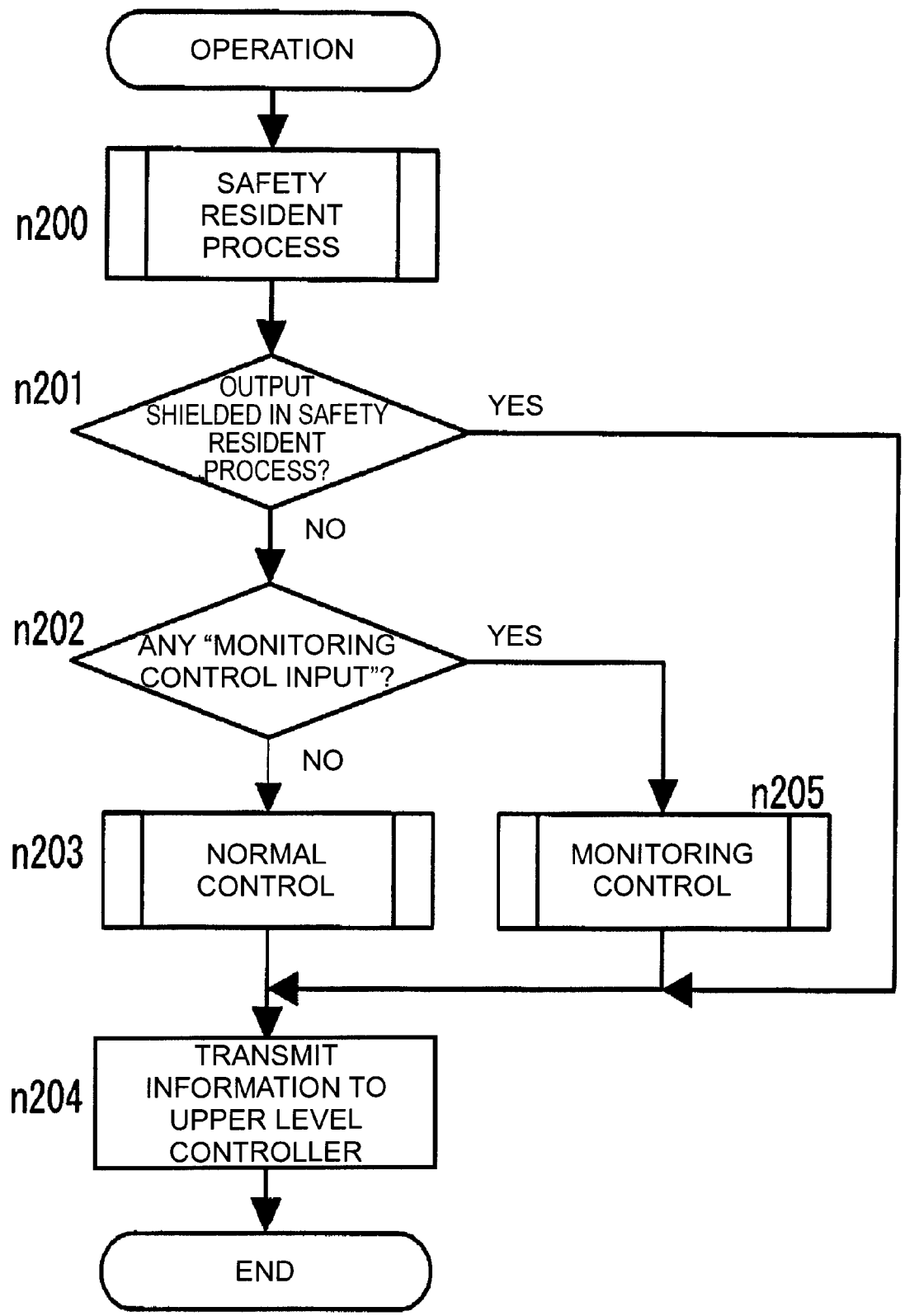
FIG. 4 is a flowchart at the time of operation.

FIG. 4 is a flowchart describing the operation at the time of operation in the embodiment of the present invention.

Figure 5:
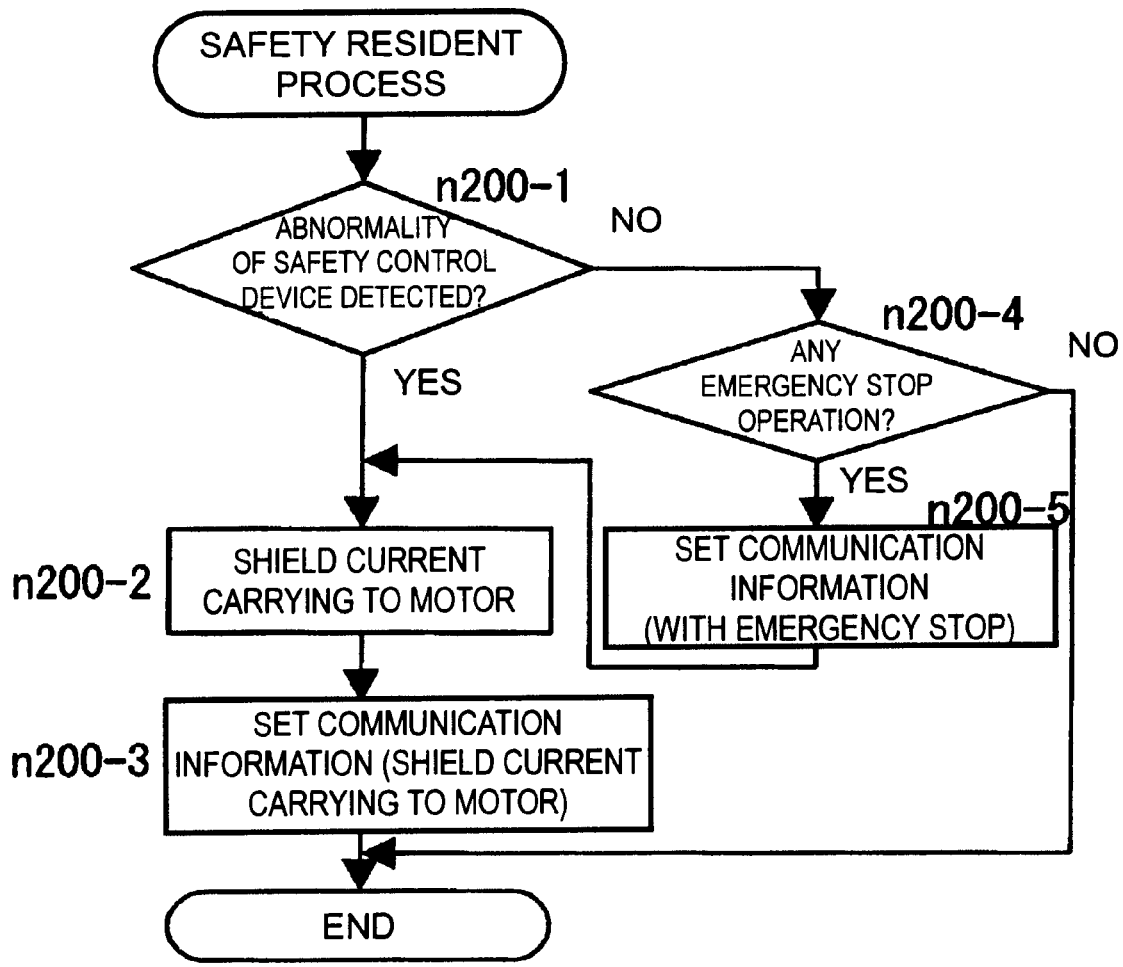
FIG. 5 is a flowchart of a resident process.

First, the safety resident process of determining whether or not the emergency stop input is made or the internal function is abnormal is performed (step n200). As shown in FIG. 5, the safety resident process determines whether or not the abnormality of the internal function of the safety control device 6 is detected (step n200-1), outputs the safety output corresponding to the dangerous side of prohibiting the operation of the machinery to the contactor 7 if abnormality is detected to open the contact of the contactor 7 and shield the current-carrying to the servo motor 2 (step n200-2), sets the communication information indicating that the current-carrying to the servo motor 2 is shielded and then terminates (step n200-3). If the abnormality of the internal function of the safety control device 6 is not detected in step n200-1, determination is made whether or not the emergency stop input is made, that is, the emergency stop operation is made (step n200-4), and the process is terminated if the emergency stop operation is not made. If the emergency stop operation is made in step n200-4, the communication information indicating that the emergency stop operation is made is set (step n200-5), and the process proceeds to step n200-2 to shield the current-carrying to the servo motor 2.

Returning back to FIG. 4, whether or not the current-carrying to the servo motor 2 is shielded is determined by the safety resident process (step n201), where the process proceeds to step n204 if shielded, and the information set in step n200-3 or step n200-5 and the information indicating if the current control is the normal control in which monitoring is not performed or the monitoring control are transmitted to the upper level controller 5, and the process is terminated.

Figure 6:
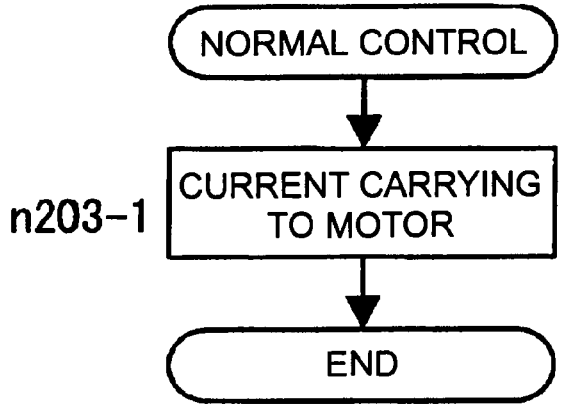
FIG. 6 is a flowchart at the time of normal control.

If determined that the current-carrying to the servo motor 2 is not shielded in step n201, whether or not the monitoring control input for enabling the monitoring is made is determined (step n202), and the process proceeds to the normal control in which monitoring is not performed if the monitoring control input for enabling the monitoring is not made (step n203). As shown in FIG. 6, in the normal control, the output of the safety output corresponding to the safety side of permitting the operation of the machinery to the contactor 7 is continued, the current-carrying to the servo motor 2 is continued and the process is terminated (step n203-1), and the process proceeds to step n204 of FIG. 4.

Figure 7:
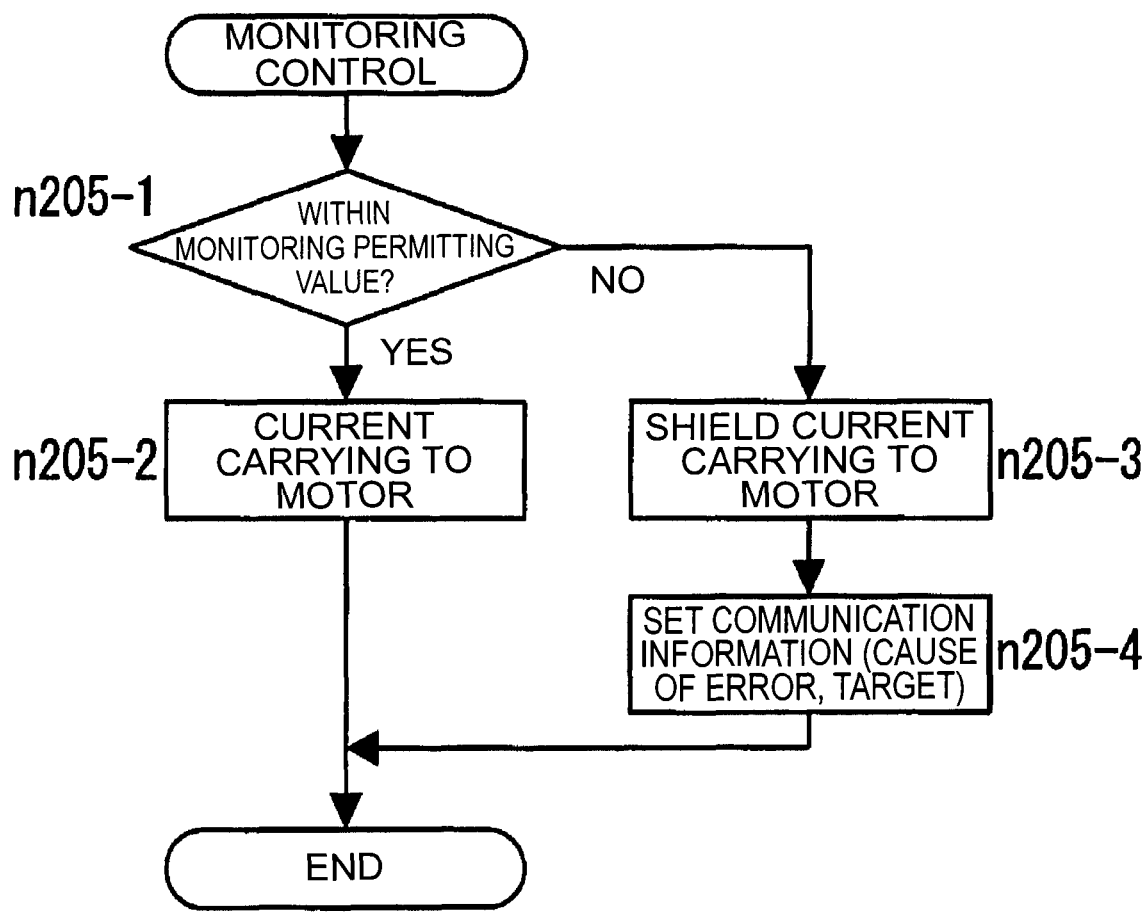
FIG. 7 is a flowchart at the time of monitoring control.

If the monitoring control input for enabling the monitoring is made in step n202 of FIG. 4, the process proceeds to the monitoring control (step n205). As shown in FIG. 7, in the monitoring control, whether or not within the monitoring permitting value such as whether or not the rotation speed of the servo motor 2 is lower than or equal to the limiting speed is determined (step n205-1), the output of the safety output corresponding to the safety side is continued with respect to the contactor 7 if within the monitoring permitting value, the current-carrying to the servo motor 2 is continued, and the process is terminated (step n205-2).

If not within the monitoring permitting value in step n205-1 such as when the rotation speed of the servo motor 2 is greater than the limiting speed, the safety output corresponding to the dangerous side is outputted with respect to the contactor 7 to open the contact, the current-carrying to the servo motor 2 is shielded (step n205-3), the communication information such as cause of error and target are set and the process is terminated (n205-4), and the process proceeds to step n204 of FIG. 4, and the set information and the information indicating whether the current control is the normal control or the monitoring control are transmitted to the upper level controller 5, and the process is terminated.

As described above, the presence of abnormality is monitored according to the setting by adding the safety control device 6 to the servo system, and the contact of the contactor 7 is opened to shield the supply of the drive power to the servo motor 2 and stop the servo motor 2 if abnormality is present, and hence the safety of the servo system can be achieved.

Furthermore, the entire servo system does not need to be interchanged with the system having a safety function to achieve safety, and thus, the safety can be achieved at low cost and the existing customized servo system can be effectively utilized.

(Other Embodiments)

Figure 8:
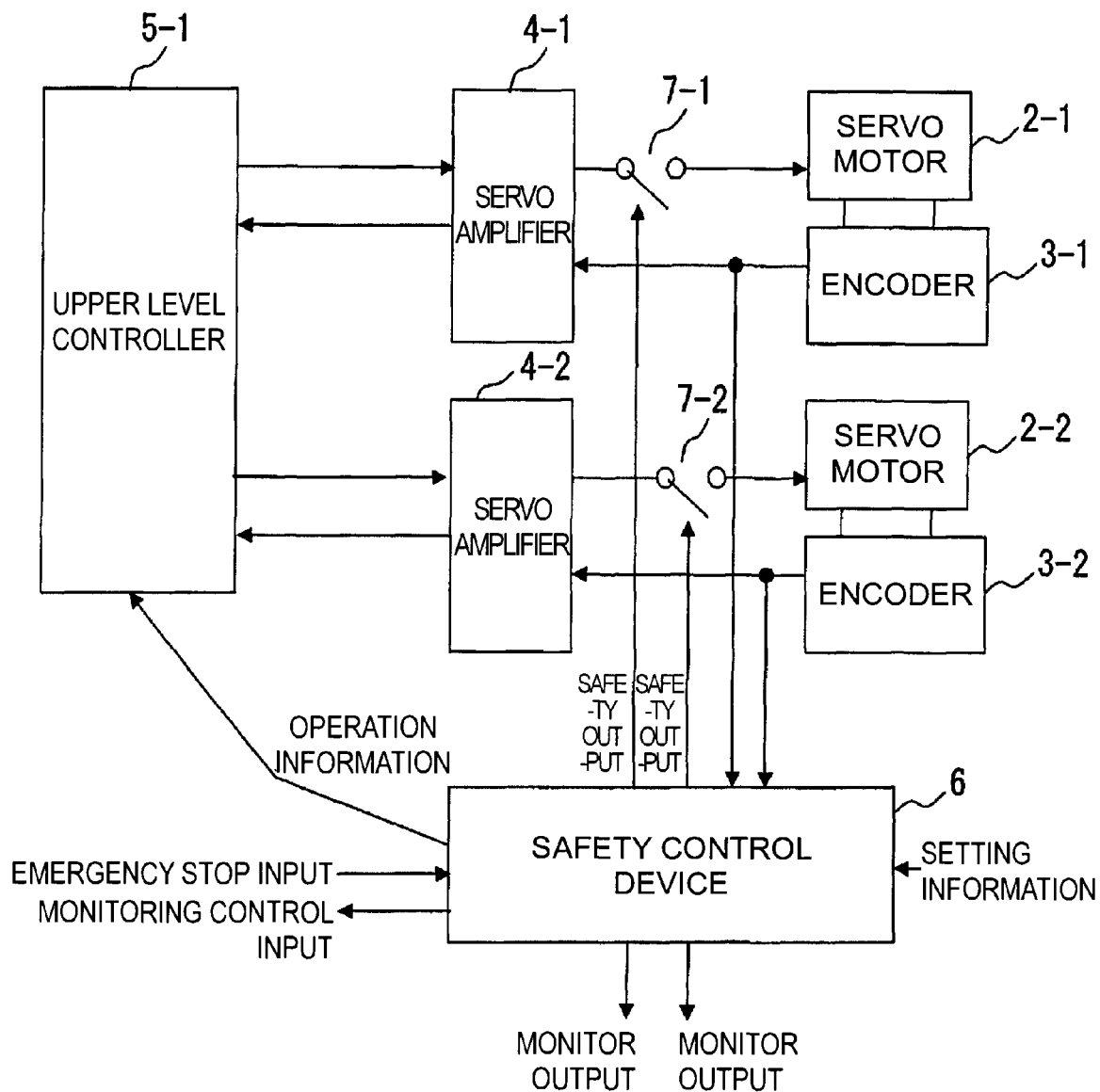
FIG. 8 is a schematic configuration diagram of a servo system according to another embodiment of the present invention.

In the above-described embodiment, description on application to a system for controlling one servo motor 2 has been made, but the present invention can be similarly applied to a system for controlling a plurality of servo motors 2-1, 2-2, as shown in FIG. 8.

The servo system of FIG. 8 includes two servo motors 2-1, 2-2, encoders 3-1, 3-2 directly connected to the respective shafts of each servo motor 2-1, 2-2, servo amplifiers 4-1, 4-2 for respectively controlling the operation of each servo motor 2-1, 2-2, and an upper level controller 5-1 such as a programmable controller (PLC) for outputting the position command information to each servo amplifier 4-1, 4-2 and being provided with the feedback information from each servo amplifier 4-1, 4-2, and also includes the safety control device 6 according to the present invention.

As with the embodiment described above, the safety control device 6 of the present embodiment is also provided with various types of setting information such as the emergency stop input from the external emergency stop switch etc., monitoring items for monitoring the presence of abnormality, parameters necessary for determining the presence of abnormality, and the like, and the monitoring control input for setting the monitoring to enable/disable.

The setting information includes items to be monitored, parameters that serve as a criteria in determining the presence of abnormality, and the like for every servo motor 2-1, 2-2. If abnormality occurs in one servo motor 2-1 by such setting information, the drive current to such a servo motor 2-1 is shielded and the drive current to the other servo motor 2-2 may be shielded.

The monitoring control input for enabling or disabling the monitoring may be provided for every servo motor 2-1, 2-2.

In this embodiment, the safety control device 6 monitors the presence of abnormality for every servo motor 2-1, 2-2 based on the output of each encoder 3-1, 3-2 individually corresponding to each servo motor 2-1, 2-2, and provides the safety output for controlling the opening and closing of the contact of each contactor 7-1, 7-2. Other configurations are similar to the embodiment described above.

Figure 9:
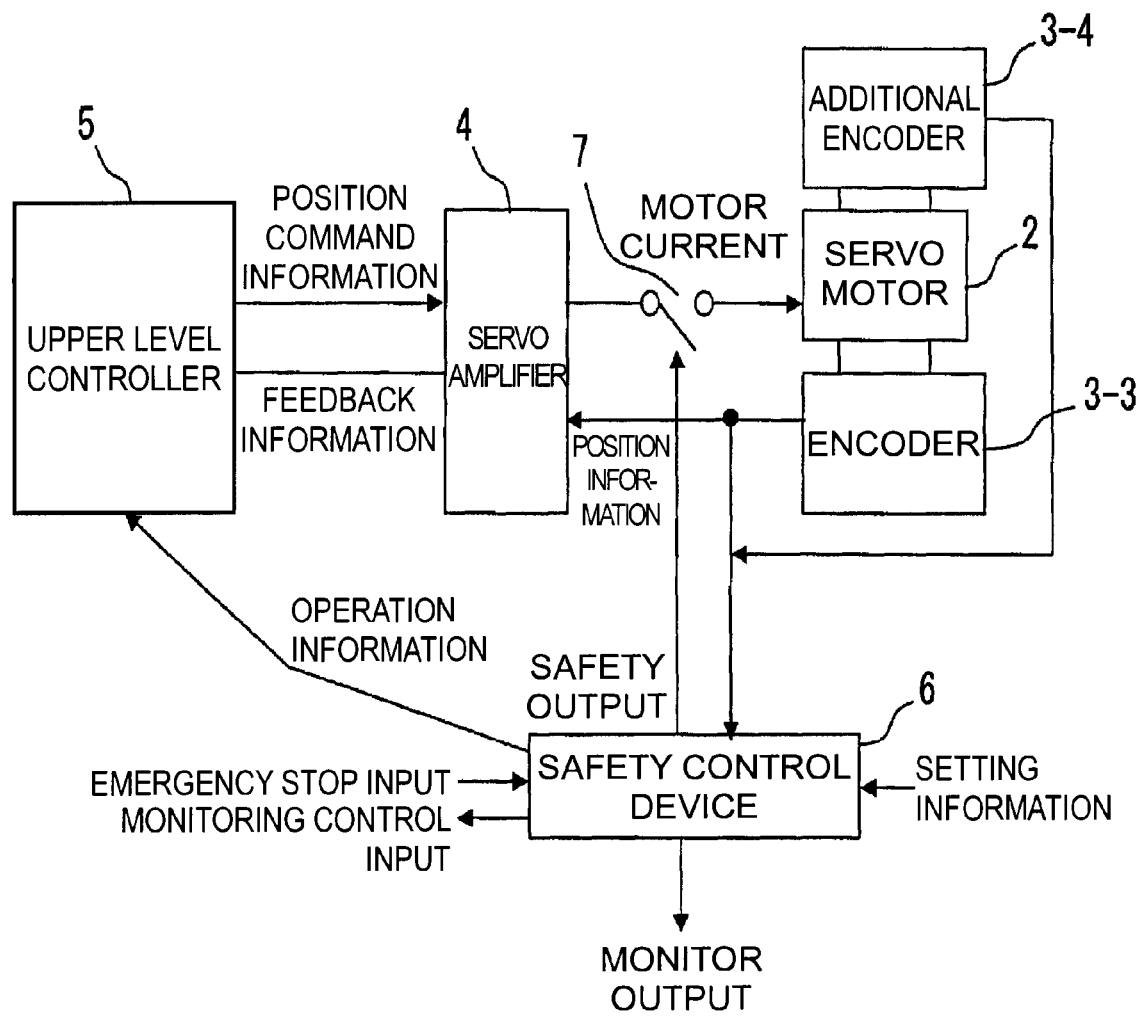
FIG. 9 is a schematic configuration diagram of a servo system according to still another embodiment of the present invention.

The encoder 3, 3-1, 3-2 of each embodiment above is an incremental encoder in which the output is duplicated, but if the encoder is an incremental encoder in which the output is not duplicated or an absolute encoder 3-3, as shown in FIG. 9, an additional incremental encoder or an absolute encoder 3-4 is added coaxially with the servo motor 2, and the presence of abnormality is detected based on the outputs of both encoders 3-3, 3-4.

The present invention is useful for the safety of the servo system.

What is claimed is:

1. A servo system comprising:
a servo motor;
an encoder attached to the servo motor, and having a feedback output, and a branched output different from the feedback output;
a servo amplifier configured to control drive of the servo motor based on the feedback output of the encoder; and
a safety control device, provided with a branched output of the encoder, configured to provide to an opening and closing unit arranged on a supply line of a drive power between the servo amplifier and the servo motor a safety output for controlling opening and closing based on the branched output; wherein
the safety control device is configured to monitor presence of abnormality based on the branched output of the encoder, and open the opening and closing unit to shield the supply of drive power to the servo motor in a case where abnormality is present,
wherein the safety control device includes a monitoring control input unit provided with a monitoring control input configured to switch enabling/disabling of the monitoring, and is configured to perform the monitoring when the monitoring control input is an input that enables the monitoring and does not perform the monitoring when the monitoring control input is an input that disables the monitoring.

2. The servo system according to claim 1, wherein the safety control device includes a setting input unit inputted with setting information including a monitoring content in monitoring the presence of abnormality, and performs the monitoring corresponding to the setting information.

3. The servo system according to claim 1, wherein the safety control device includes a safety input unit provided with an emergency stop input, and is configured shields the supply of the drive power to the servo motor in response to the emergency stop input.

4. The servo system according to claim 1, further comprising:
a controller configured to provide a control command to the servo amplifier; wherein
when the supply of the drive power to the servo motor is shielded, the safety control device transmits to the controller that the supply of the drive power is shielded.

5. The servo system according to claim 1, wherein the encoder is an incremental encoder in which the output is duplicated, the output of the encoder including an A-phase signal, a B-phase signal, an inverted A-phase signal, and an inverted B-phase signal.

6. The servo system according to claim 1, wherein the encoder is an incremental encoder in which the output is duplicated, the output of the encoder including a sin signal, a cos signal, an inverted sin signal, and an inverted cos signal.

7. The servo system according to claim 1, wherein
an additional encoder is attached to the servo motor separate from the encoder; and the safety control device monitors the presence of abnormality based on the outputs of the encoder and the additional encoder.

8. A safety control device, provided with a branched output of an encoder attached to a servo motor, the branched output being different from a feedback output of the encoder, configured to output to an opening and closing unit arranged on a supply line of a drive power between the servo motor and a servo amplifier configured to control drive of the servo motor a safety output for controlling opening and closing; wherein
the safety control device is configured to monitor for a presence of abnormality is monitored based on the output of the encoder, and is configured to open the opening and closing unit is opened by the safety output to shield the supply of the drive power to the servo motor in a case where abnormality is present;
a setting input unit inputted with setting information including content of the monitoring; and
a monitoring control input unit provided with a monitoring control input for switching enabling/disabling of the monitoring; wherein
the safety control device is configured so that the monitoring corresponding to the setting information is performed when the monitoring control input is an input that enables the monitoring, and the monitoring is not performed when the monitoring control input is an input that disables the monitoring.

9. The safety control device according to claim 8, further comprising:
a safety input unit provided with an emergency stop input; wherein
the opening and closing unit is opened to shield the supply of the drive power to the servo motor in response to the emergency stop input; and
when the supply of the drive power to the servo motor is shielded, the shielding of the supply of the drive power is transmitted to a controller for providing a control command to the servo amplifier.

* * * * *